United States Patent

[11] 3,572,766

| [72] | Inventor | Henry J. Jezek |
| | | 1204 E. Downs Ave., Temple, Tex. 76501 |
| [21] | Appl. No. | 844,099 |
| [22] | Filed | July 23, 1969 |
| [45] | Patented | Mar. 30, 1971 |

[54] LOCKPIN ASSEMBLY
5 Claims, 2 Drawing Figs.

| [52] | U.S. Cl. | 280/515 |
| [51] | Int. Cl. | B60d 1/02 |
| [50] | Field of Search | 280/515;- 24/(Inquired) |

[56] References Cited
UNITED STATES PATENTS

| 2,436,210 | 2/1948 | Fuhrer et al. | 280/515 |
| 2,454,856 | 11/1948 | Bible | 280/515 |
| 3,011,801 | 12/1961 | Neumann | 280/515 |
| 3,350,117 | 10/1967 | Kassmeier | 280/515 |

*Primary Examiner*—Benjamin Hersh
*Assistant Examiner*—Robert R. Song
*Attorney*—Hyer, Eickenroht, Thompson & Turner

ABSTRACT: The lockpin assembly disclosed includes a pin for inserting through the aligned holes of a tongue and drawbar to connect them together. To hold the pin in place two generally L-shaped members are used. They are pivotally connected together. One of them is pivotally connected to the top of the pin, while the free end of the other member has a sleeve that slides over the lower end of the pin underneath the drawbar and tongue. A collar is used to hold the two members from relative rotation, after the sleeve is in place over the end of the pin, to lock the pin in position to hold the drawbar and tongue connected together.

PATENTED MAR 30 1971
3,572,766
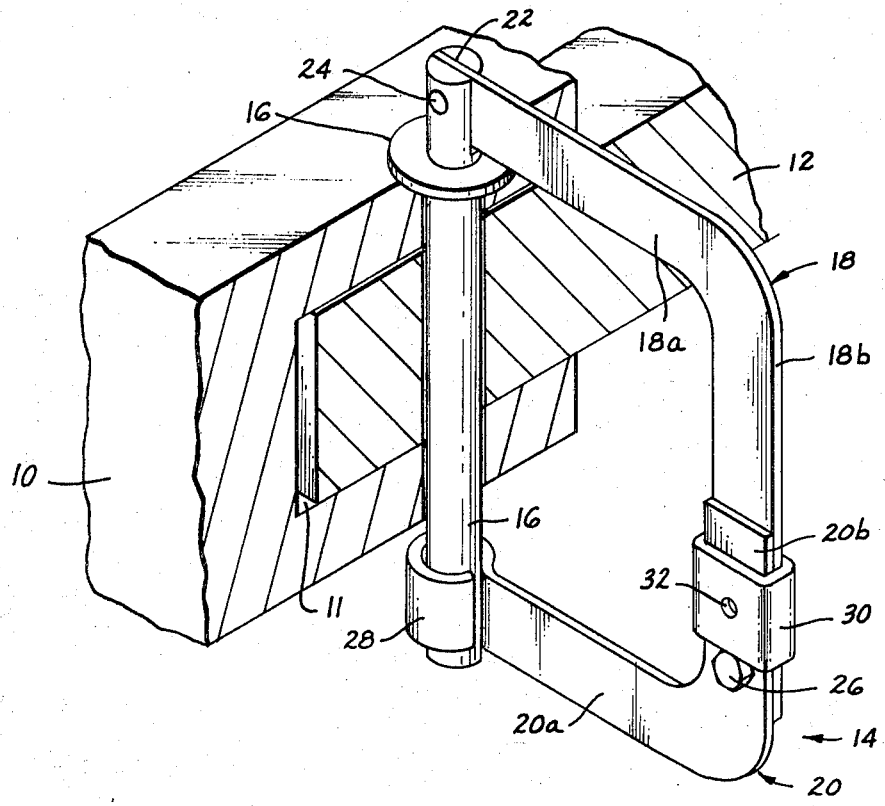
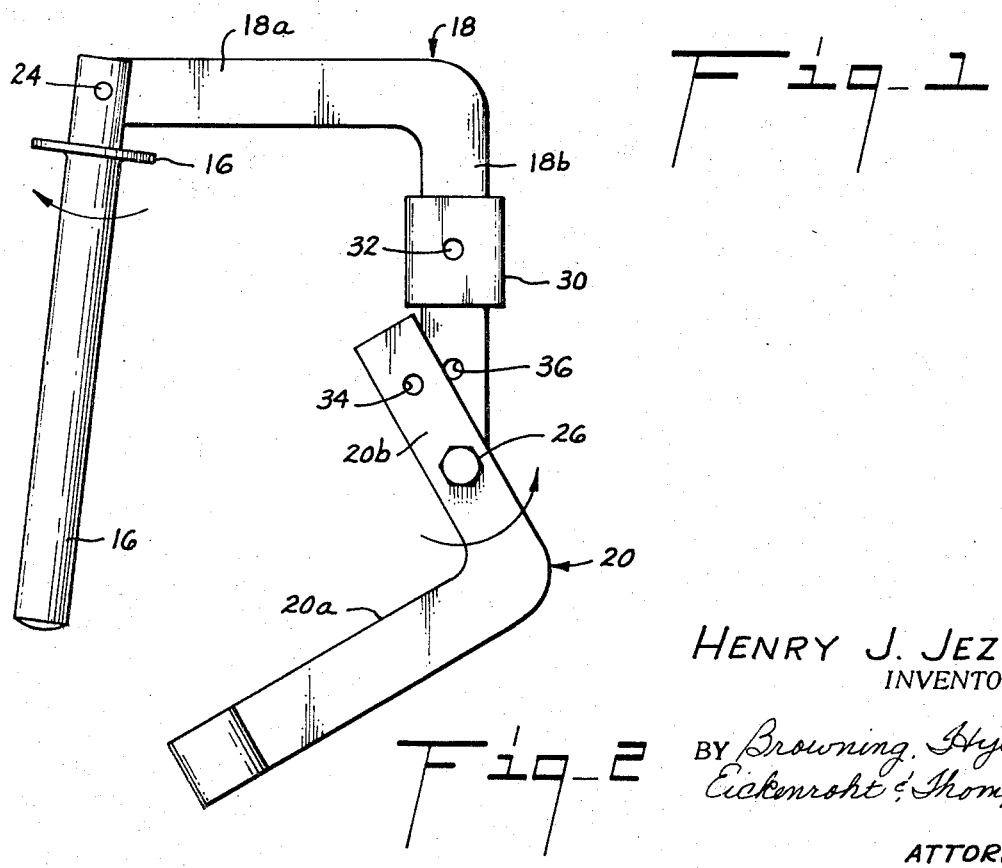
Fig. 1
Fig. 2
HENRY J. JEZEK
INVENTOR.
BY Browning, Hyer,
Eickenroht & Thompson
ATTORNEYS

LOCKPIN ASSEMBLY

This invention relates generally to pins for connecting together the drawbar of a towing vehicle with the tongue of a vehicle being towed and, in particular, to such a pin that is releasably held or locked in position so that it will not accidentally release the connection between the drawbar and tongue.

Pins or hitch pins, as they are sometimes called, are inserted in aligned holes in a drawbar and tongue to connect the two together. This provides a connection that allows one to pivot relative to the other, as required, when the towing vehicle is making a turn. The use of pins for this purpose is well known. Also, well known is the problem of keeping the pins in place in the holes, as the two vehicles travel over the country. This is particularly a problem where the vehicles are traveling over a rough surface.

It is an object of this invention to provide an improved lockpin assembly, for releasably connecting the drawbar of a pulling vehicle with the tongue of a drawn vehicle, that is anchored in position and to hold it from moving inadvertently out of the aligned holes through which it extends.

It is another object of this invention to provide an improved lockpin assembly that can be quickly and easily placed in position to connect two vehicles together and which also can be quickly and easily removed therefrom.

It is a further object of this invention to provide a lockpin assembly that is easy to operate, requires no spring forces to maintain the lockpin in the desired position, and which is of simple construction.

These and other objects, advantages, and features of this invention will be apparent to those skilled in the art from a consideration of this specification, including the appended claims and attached drawings.

The invention will now be described in connection with the attached drawings in which, FIG. 1 is an isometric view of the preferred embodiment of this invention showing the lockpin assembly in position connecting together a drawbar and tongue; and FIG. 2 is a side elevational view of the lockpin assembly of FIG. 1 in position for insertion into or removal from the aligned holes in a tongue and drawbar.

Drawbar 10 has slot 11 in its end to receive tongue 12. Both the drawbar and the tongue are provided with holes, usually vertical, which can be aligned to receive a pin. In the embodiment shown, lockpin assembly 14, includes pin 16, which is shown in FIG. 1 extending through aligned openings in the drawbar and tongue. This connects the drawbar and tongue together. There are, of course, many other configurations of drawbars and tongues with which the pin can be used.

Pin 16 of the lockpin assembly is long enough to extend completely through the openings in the drawbar and tongue and protrude both above and below. Stop washer 16 is attached to the pin adjacent its upper end to limit the distance the pin can extend into the openings.

In accordance with this invention, means are provided for releasably locking the pin in such openings. In the embodiment shown, such means include first and second members 18 and 20. Each member is generally L-shaped to provide each with two legs that are at right angles with each other. Means are provided for connecting first member 18 to the upper end of pin 16 for pivotal movement relative to the pin in a plane generally parallel to the longitudinal axis of the pin. In the embodiment shown, the end of leg 18a of member 18 is positioned in vertical slot 22 in the upper end of the pin. Shaft 24 extends transversely through the pin and the end of leg 18a of the first member to connect the member to the pin for pivotal movement in a plane generally parallel to the longitudinal axis of the pin. The bottom of slot 22 limits the distance the member can pivot downwardly relative to the pin.

Means are also provided to pivotally connect the second member to the first member for pivotal movement in a plane parallel to the plane in which the first member pivots. In the embodiment shown, bolt 26 extends through legs 18b and 20b of the members to connect the members to so pivot relative to each other. The members are so shaped that a portion of the second member can be positioned adjacent the portion of pin 16 that extends downwardly below the drawbar and tongue. In the embodiment shown, the members are shaped so that the free end of leg 20a of second member 20 can be positioned adjacent this portion of the pin. Means are attached to the portion of the second member adjacent the lower end of the pin for releasably engaging the lower end of the pin to hold the member from movement laterally of the pin. In the embodiment shown, such means comprises sleeve 28 formed in the end of leg 20a of the second member. Sleeve 28 has an opening therein to receive the lower end of pin 16, as shown in FIG. 1. With the pin extending into the sleeve, member 20 will be held against lateral movement relative to the pin.

To complete the assembly, means are provided for releasably holding the first and second members from relative pivotal movement after the sleeve has been moved upwardly over the lower end of the pin. This will anchor the pin in the sleeve opening and prevent it from being removed therefrom until the sleeve has been removed from the lower end of the pin. In the embodiment shown, collar 30 is mounted to slide on leg 18b of member 18 and can be moved upwardly to the position shown in FIG. 2 to permit second member 20 to pivot relative to the first member. Then when sleeve 28 has been positioned over the end of pin 16, the collar can be moved downwardly to encircle leg 20b of the second member, as well as leg 18b of the first member, and hold the two members from relative rotation. Bolt 26 limits the downward travel of collar 30.

If desired, lateral opening 32 can be provided in collar 30 and openings 34 and 36 can be provided in legs 18b and 20b of the members, respectively, with all the holes located so that they will be aligned when the lockpin assembly is in the position shown in FIG. 1. A pin (not shown), piece of wire, or the like can be inserted through the openings to hold the collar in place and keep it from being bounced upwardly to accidentally release the members for rotation.

From the foregoing description of one embodiment of this invention by way of example, it will be seen that this invention is one well adapted to attain all of the ends and objects hereinabove set forth, together with other advantages which are obvious and which are inherent to the apparatus and structure.

I claim:

1. A lockpin assembly for releasably connecting the drawbar of a pulling vehicle with the tongue of a drawn vehicle where the drawbar and the tongue have aligned holes to receive the pin to connect the drawbar and tongue, said lockpin assembly comprising a pin for inserting through such aligned holes, said pin being long enough to extend above and below the drawbar and tongue, and means for releasably locking the pin in such openings including first and second members, means connecting the first member to the upper end of the pin for pivotal movement of the first member relative to the pin in a plane parallel to the longitudinal axis of the pin, means connecting the second member to the first member for pivotal movement relative to the first member in a plane parallel to the plane in which the first member pivots relative to the pin, said members being shaped to permit a portion of the second member to be positioned adjacent the portion of the pin extending below the drawbar and tongue when the pin is in the aligned holes therein, means on said portion of the second member for releasably engaging the lower end of the pin to hold the member from movement laterally of the pin and means for releasably holding the members from relative pivotal movement when the pin-engaging means on the second member is in engagement with the pin to anchor the pin in the openings through the drawbar and tongue.

2. The lockpin assembly of claim 1 in which the engaging means in the second member comprise a sleeve attached to the member and slidable over the lower end of the pin.

3. The lockpin assembly of claim 2 in which the first and second members have portions in side-by-side, generally parallel relationship when the pin-engaging means on the second member is in engagement with the pin and said means for holding the members against relative pivotal movement includes a collar slidable on said first member and movable between a position above the said parallel portion of the second member to permit the members to pivot relatively and a position encircling portions of both members to hold the members against relative rotation.

4. A lockpin assembly for releasably connecting the drawbar of a pulling vehicle with the tongue of a drawn vehicle where the drawbar and the tongue have aligned holes to receive the pin to connect the drawbar and tongue, said lock pin assembly comprising a pin for inserting through such aligned holes, a first L-shaped member with one end pivotally connected to the upper end of the pin, a second L-shaped member having a sleeve attached thereto with an opening through which the lower end of the pin may extend, said second member being pivotally connected to the first member to permit the two L-shaped members to be positioned with the lower end of the pin in the sleeve, when the pin is in place in the opening through the drawbar and tongue, and means for releasably holding the first and second members from pivoting relative to each other to hold the sleeve in position over the lower end of the pin to hold the pin in the opening in the drawbar and tongue.

5. The lockpin assembly of claim 4 in which the two portions of the first and second members that are pivotally connected together are parallel when the pin is positioned in the opening in the second member and said holding means includes a collar movable axially between a position on the first member above the second member and a position encircling both members to hold the members against pivotal movement relative to each other.